W. H. LUCAS, Jr.
ANTISKID CHAIN.
APPLICATION FILED FEB. 1, 1922.

1,427,003.

Patented Aug. 22, 1922.

Inventor
Walter H. Lucas Jr.
BY John A. Bernhardt
Atty.

UNITED STATES PATENT OFFICE.

WALTER H. LUCAS, JR., OF WEST PARK, OHIO, ASSIGNOR TO SARAH A. GIBBONS, OF CLEVELAND, OHIO.

ANTISKID CHAIN.

1,427,003.               Specification of Letters Patent.     Patented Aug. 22, 1922.

Application filed February 1, 1922. Serial No. 533,265.

*To all whom it may concern:*

Be it known that I, WALTER H. LUCAS, Jr., a citizen of the United States, residing at West Park, in the county of Cuyahoga and State of Ohio, have invented certain new and useful Improvements in Antiskid Chains, of which the following is a specification.

This invention relates to antiskid chains adapted to be applied to wheel tires, and has for its object to provide an improved and simple chain which can be quickly applied to or removed from tires and which when applied will serve to prevent skidding or slip of the wheel or tire.

The device embodies a chain, and a bail or hooked member to which the ends of the chain are attached, the bail extending across the felloe between the spokes and being provided with a roller which permits the chain to move along the surface of the tire to a certain extent, whereby better traction is assured because the chain will remain in contact with the ground and also is not apt to damage the tire as when it remains in a fixed position.

Figure 1:
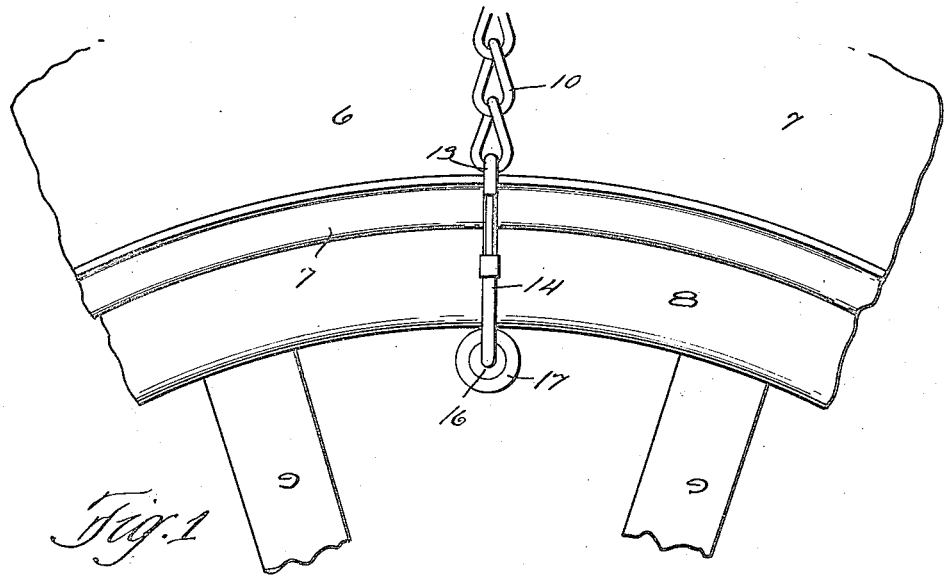
Figure 2:
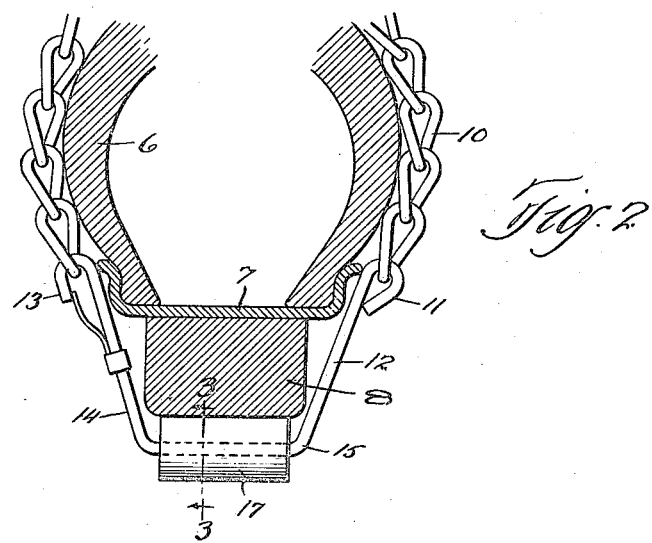
Figure 3:

The invention is illustrated in the accompanying drawings in which Fig. 1 is a side elevation of a part of a wheel provided with the device. Fig. 2 is a cross section of a tire and felloe with the device thereon. Fig. 3 is a detail in section of the roller, on the line 3—3 of Fig. 2.

In the drawings, 6 indicates the tire, 7 the rim, 8 the felloe and 9 the spokes of a wheel. The chain 10 of the antiskid device extends crosswise of the tire when applied, and is connected at one end to a loop 11 at the end of one arm 12 of a bail, and the other end of the chain is connected to a snap hook 13 at the end of the other arm 14 of the bail, the arms 12 and 14 being connected by a cross piece 15 which extends across the felloe at the inside thereof. This cross piece is provided with a roller which may consist of a metal or other core 16 and a rubber sleeve 17 which when the parts are applied rests in contact with the inner surface of the felloe.

The device is applied with just enough tightness to retain it normally in position. When in the revolution of the wheel the chain contacts with the ground it will slip to a certain extent, but will at the same time afford a traction surface for the tire which prevents spinning or skidding of the wheel, the roller running along the felloe until it comes in contact with a spoke which then carries the device around in further rotation of the wheel. The rubber roller also prevents injuring the surface of the felloe or spokes.

It is obvious that the device may be quickly applied, and one or more may be used according to local conditions.

I claim:

1. An antiskid device for wheels comprising a chain adapted to extend across the wheel tire, and a bail connected to the ends of the chain and extending across within the wheel felloe, said bail being provided with a roller adapted to contact with the inner surface of the felloe, between the spokes of the wheel.

2. An antiskid device for wheels comprising a chain adapted to extend across the wheel tire, and a bail having diverging arms each of which is connected to one end of the chain and a cross piece connecting those arms and extending across within the felloe, said cross being provided with a composition roller adapted to rest against the inside of the felloe.

In testimony whereof, I affix my signature in presence of two witnesses.

WALTER H. LUCAS, Jr.

Witnesses:
   JOHN A. BOMMHARDT,
   BESSIE F. POLLAK.